(12) United States Patent
Suwabe et al.

(10) Patent No.: US 6,632,546 B2
(45) Date of Patent: Oct. 14, 2003

(54) MAGNETO-OPTICAL RECORDING MEDIUM

(75) Inventors: Masatsugu Suwabe, Miyagi (JP); Yoshihisa Chiba, Miyagi (JP)

(73) Assignee: Sony Corporation, Tokyo (JP)

( * ) Notice: Subject to any disclaimer, the term of this patent is extended or adjusted under 35 U.S.C. 154(b) by 236 days.

(21) Appl. No.: 09/778,539

(22) Filed: Feb. 7, 2001

(65) Prior Publication Data

US 2001/0024740 A1 Sep. 27, 2001

(30) Foreign Application Priority Data

Feb. 7, 2000 (JP) .................................. P2000-034376

(51) Int. Cl.$^7$ ................................................. G11B 5/66
(52) U.S. Cl. ..................... 428/694 ML; 428/694 MN; 428/694 IS; 428/694 GR; 428/900; 369/13; 369/14; 369/272; 369/286; 369/288
(58) Field of Search ................ 428/694 ML, 639 MM, 428/639 IS, 639 GR, 900; 369/13, 14, 272, 286, 288

(56) References Cited

U.S. PATENT DOCUMENTS

| | | | | |
|---|---|---|---|---|
| 5,705,286 A | * | 1/1998 | Hirokane | 428/639 ML |
| 5,901,118 A | * | 5/1999 | Iketani et al. | 369/13 |
| 5,939,187 A | * | 8/1999 | Hirokane | 428/332 |
| 5,955,191 A | * | 9/1999 | Hirokane | 428/332 |
| 6,424,601 B1 | * | 7/2002 | Oonuki | 369/13.08 |
| 6,449,221 B1 | * | 9/2002 | Knight | 363/13.35 |

FOREIGN PATENT DOCUMENTS

| | | |
|---|---|---|
| EP | 0592199 | 4/1994 |
| EP | 0782135 | 7/1997 |
| EP | 0810594 | 12/1997 |
| EP | 0965987 | 12/1999 |
| EP | 1098306 | 5/2001 |

* cited by examiner

Primary Examiner—Leszek Kiliman
(74) Attorney, Agent, or Firm—Sonnenschein, Nath & Rosenthal LLP (57) ABSTRACT

A recording layer 6 records and stores information and comprises a plurality of layers, namely a first layer 6a and a second layer 6b. The first layer 6a is made from a recording material which gives parallel directions to saturation magnetization and sublattice magnetization. The second layer 6b is made from a recording material which gives antiparallel directions to saturation magnetization and sublattice magnetization at room temperature. The recording material for the second layer 6b gives parallel directions to saturation magnetization and sublattice magnetization at around a read temperature.

6 Claims, 11 Drawing Sheets

MAGNETO-OPTICAL RECORDING MEDIUM

RELATED APPLICATION DATA

The present application claims priority to Japanese Application No. P2000-034376 filed Feb. 7, 2000, which application is incorporated herein by reference to the extent permitted by law.

BACKGROUND OF THE INVENTION

1. Technical Field

The present invention relates to a magneto-optical recording medium for writing or reading information by means of magneto-optical recording. More particularly, the present invention relates to a magneto-optical recording medium having increased recording density by means of the magnetically induced super resolution technology.

2. Prior Art

A magneto-optical recording medium is practically used as a rewritable recording medium for writing or reading information according to a magneto-optical recording technology.

In recent years, particular attention is paid to a technology called the magnetically induced super resolution (MSR) in the field of magneto-optical recording media for increasing recording density. This technology makes it possible to read information from a recording mark which is smaller than a spot diameter of a light beam used for recording and reproducing information.

The MSR uses temperature distribution in a spot of the light beam for recording and reproducing information and masks a low- or high-temperature region in the spot. This enables to read information from a recording mark which is smaller than a spot diameter of the light beam.

As an example of the MSR, Jpn. Pat. Appln. Laid-Open Publication No. 5-81717 discloses a system called CAD (Center Aperture Detection).

The CAD system uses a magneto-optical recording medium comprising a read layer, a recording layer, and a non-magnetic film. At room temperature, the read layer maintains an in-plane magnetization state in which in-plane magnetic anisotropy is predominant. As a temperature rises, the read layer becomes a vertical magnetization state in which vertical magnetic anisotropy is predominant. The recording layer records and stores information. The non-magnetic film is placed between the read layer and the recording layer for preventing both layers against exchange coupling. Information is recorded on the recording layer of the magneto-optical recording medium through the use of a recording mark which is smaller than a spot diameter of the light beam used for recording and reproduction.

When a light beam is irradiated onto the read layer during reproduction, the laser beam heats the read layer and increases its temperature. At this time, a light beam is stopped down to the diffraction limit by means of a condensing lens. The corresponding light intensity distribution becomes the Gaussian distribution. Temperature distribution on the read layer also becomes the Gaussian distribution. When a light beam is irradiated to a given region on the read layer, only the region's center is heated to approximately a magnetic compensation temperature and becomes a vertical magnetization state.

A leakage field is applied from the recording layer to the region in the vertical magnetization state on the read layer, transferring a recording mark on the recording layer. Only the light beam spot center becomes the vertical magnetization state on the read layer. The other regions remain in the in-plane magnetization state. Accordingly, the other regions mask magnetization of the recording layer. As a result, it is possible to read information from a recording mark smaller than the light beam spot diameter.

The above-mentioned CAD system is a very excellent technology, providing advantages of having relatively simple film configuration and eliminating the need for applying an external magnetic field for initialization during reproduction.

However, the CAD system transfers recording marks on the read layer by using a leakage field from the recording layer. Therefore, the CAD system causes a problem of a decreased transfer force compared to the other systems which uses exchange coupling for transferring recording marks.

In the CAD system, a transfer force depends on recording mark lengths. Namely, a transfer force with a long recording mark is weaker than that with a short recording mark. Generally, a magneto-optical recording medium uses the recording mark length of 2T through 8T, where T is one channel clock cycle. The longest mark is four times longer than the shortest mark. Accordingly, even if a relatively short recording mark is transferred, a relatively long recording mark is not transferred properly, thus eventually causing a read error.

For increasing a transfer force of the recording mark, it is effective to change the composition of the recording layer comprising a rare-earth transition-metal (R-TM) alloy film so that the composition becomes TM-rich. Alternatively, it is effective to increase the saturation magnetization (Ms) for the recording layer by increasing the recording layer thickness, for example. Namely, a temperature (read temperature) is generated when the read layer changes from the in-plane magnetization state to the vertical magnetization state. When the saturation magnetization (Ms) is increased for the recording layer at the read temperature, it is possible to increase the transfer force of the recording mark by strengthening the leakage field from the recording layer.

However, if an attempt is made to simply increase the saturation magnetization (Ms) for the recording layer, this magnetization also increases in a temperature range lower than the read temperature. Consequently, the read temperature is spread to a low-temperature side, thus broadening a read area and degrading the spatial resolution.

BRIEF SUMMARY OF THE INVENTION

The present invention has been made in consideration of the foregoing. It is therefore an object of the present invention to provide a magneto-optical recording medium which can increase a transfer force of the recording mark by strengthening a leakage field from the recording layer without degrading the spatial resolution.

After repeated examinations for solving the above-mentioned problems, the inventor found the following. Namely, when a recording layer for recording and storing information comprises a plurality of layers with different compositions, saturation magnetization for the recording layer can be higher than that for a single-layer recording layer at around a read temperature. Alternatively, the saturation magnetization can be lower than that for a single-layer recording layer in a temperature range lower than the read temperature. When such a recording layer is used for a magneto-optical recording medium, it is possible to increase a transfer force of a recording mark without degrading the spatial resolution.

A magneto-optical recording medium according to the present invention is originated on the basis of the above-mentioned knowledge and is characterized by comprising a read layer maintaining an in-plane magnetization state predominantly characterized by in-plane magnetic anisotropy at room temperature and changing to a vertical magnetization state predominantly characterized by vertical magnetic anisotropy as temperature rises, a recording layer for recording and storing information, and a non-magnetic film sandwiched between said read layer and said recording layer for preventing exchange coupling between said read layer and said recording layer, wherein said recording layer comprises a first layer and a second layer with different compositions from each other; said first layer is made from a recording material giving parallel directions to saturation magnetization and sublattice magnetization; and said second layer is made from a recording material giving antiparallel directions to saturation magnetization and sublattice magnetization at room temperature and giving parallel directions to saturation magnetization and sublattice magnetization at around a read temperature at which said read layer changes from an in-plane magnetization state to a vertical magnetization state.

A recording layer of this magneto-optical recording medium comprises a plurality of layers, namely first and second layers. The first layer comprises, say, an amorphous thin film or the like made from a TbFeCo alloy. Such a recording material gives parallel directions to saturation magnetization and sublattice magnetization on the recording layer. The second layer comprises, say, an amorphous thin film or the like made from a GdFeCo alloy. At room temperature, such a recording material gives antiparallel directions to saturation magnetization and sublattice magnetization. At around a read temperature, the material gives parallel directions to saturation magnetization and sublattice magnetization. The saturation magnetization for the recording layer is higher than that for a single-layer recording layer at around a read temperature. Alternatively, the saturation magnetization is lower than that for a single-layer recording layer in a temperature range lower than the read temperature.

The saturation magnetization for the recording layer increases at around a read temperature. Because of this, it is possible to increase a transfer force of the recording mark by strengthening a leakage field from the recording layer. The saturation magnetization for the recording layer decreases in a temperature range lower than the read temperature. This prevents a read area from expanding due to the read temperature shifting to a low-temperature side and maintains the spatial resolution.

A magneto-optical recording medium according to the present invention should maintain the relation Tc1<Tc2, where Tc1 is a Curie temperature of the recording material constituting the first layer of the recording layer; Tc2 is a Curie temperature of the recording material constituting the second layer of the recording layer. To achieve this relation, it is desirable to use the second layer's recording material which provides a higher Curie temperature than the first layer's recording material. When such a recording material is used for the second layer of the recording layer, it is possible to generate a leakage field from the recording layer also at around a Curie temperature on the first layer with relatively large saturation magnetization for the entire recording layer. A recording mark can be transferred properly even if the read area center is available at an approximate Curie temperature on the first layer.

For the magneto-optical recording medium according to the present invention, it is desirable to provide an auxiliary read layer comprising, say, a GdFe alloy between the read layer and the recording layer in order to drastically change a read layer state at the read temperature. For this purpose, the use of such an auxiliary read layer enables to provide higher density.

As mentioned above in detail, the magneto-optical recording medium according to the present invention includes the recording layer for recording and storing information. This recording layer comprises a plurality of layers, namely first and second layers. The first layer uses a recording material which gives parallel directions to saturation magnetization and sublattice magnetization on the recording layer. The second layer uses a recording material which gives antiparallel directions to saturation magnetization and sublattice magnetization at room temperature. This material for the second layer gives parallel directions to saturation magnetization and sublattice magnetization at around a read temperature. The saturation magnetization for the recording layer is higher than that for a single-layer recording layer at around a read temperature. Alternatively, the saturation magnetization is lower than that for a single-layer recording layer in a temperature range lower than the read temperature. Accordingly, this magneto-optical recording medium can increase a transfer force of a recording mark without degrading the spatial resolution.

DETAILED DESCRIPTION OF THE INVENTION

Embodiments of the present invention will be described in further detail with reference to the accompanying drawings. For better understanding of the explanation, the magneto-optical recording medium according to the present invention is described in comparison with a conventional magneto-optical recording medium.

Figure 1:
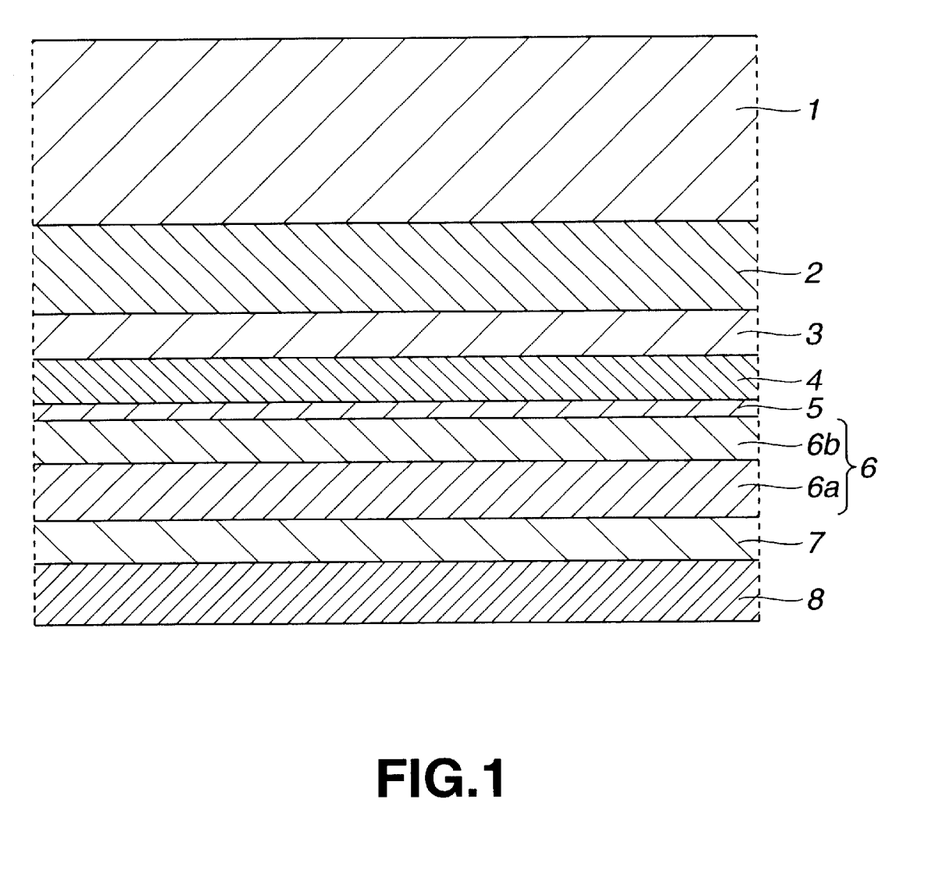
FIG. 1 is a sectional view showing a structure of a magneto-optical recording medium according to the present invention.

A magneto-optical recording medium according to the present invention enables to read information from a recording mark smaller than a light beam spot diameter due to MSR according to the so-called CAD (Center Aperture Detection) system. As shown in FIG. 1, the magneto-optical recording medium comprises a transparent dielectric layer 2, a read layer 3, an auxiliary read layer 4, a non-magnetic layer 5, a recording layer 6, a transparent dielectric layer 7, and a heat diffusion layer 8 laminated in this order on a substrate 1. The recording layer 6 of the magneto-optical recording medium according to the present invention comprises a plurality of layers, namely a first layer 6a and a second layer 6b. The first layer 6a uses a recording material which gives parallel directions to saturation magnetization and sublattice magnetization on the recording layer. The second layer 6b uses a recording material which gives antiparallel directions to saturation magnetization and sublattice magnetization at room temperature. This material for the second layer 6b gives parallel directions to saturation magnetization and sublattice magnetization at around a read temperature. At this read temperature, the read layer 3 changes from an in-plane magnetization state to a vertical magnetization state.

A conventional magneto-optical recording medium uses a recording layer comprising a single-layer recording material. By contrast, the magneto-optical recording medium according to the present invention uses the recording layer 6 comprising the first layer 6a and the second layer 6b with different compositions. Except the recording layer 6, the magneto-optical recording medium according to the present invention uses the same layers as those for the conventional magneto-optical recording medium. It is further believed obvious that the configuration of the magneto-optical recording medium described here is provided as an example and can be subject to modifications according to characteristics and the like as needed.

With respect to the magneto-optical recording medium as shown in FIG. 1, the substrate 1 is made from a material such as polycarbonate having sufficient transmittance for the recording and reproduction light. The substrate 1 is formed by means of injection molding and the like. On this substrate 1, there are formed a guide groove for easily performing tracking control and pits representing address information and the like as required.

The transparent dielectric layer 2 comprises an SiN film and the like formed by, say, high-frequency sputtering and the like.

The read layer 3 is formed on the transparent dielectric layer 2 by, say, direct-current sputtering and the like and is made from a rare-earth transition-metal (R-TM) alloy film such as a GdFeCo alloy film. The read layer 3 is an RE-rich rare-earth transition-metal alloy film which contains more rare-earth metal than the compensated composition at room temperature. At room temperature, the read layer 3 maintains an in-plane magnetization state in which in-plane magnetic anisotropy is predominant. As the temperature rises, the read layer 3 becomes a vertical magnetization state in which vertical magnetic anisotropy is predominant. At room temperature, the read layer 3 maintains an in-plane magnetization state. In this state, high saturation magnetization causes large geometrical magnetic anisotropy and causes a magnetization direction to fall in the plane. As the temperature rises, the saturation magnetization decreases. At an approximate magnetic compensation temperature ($T_{comp}$), the geometrical magnetic anisotropy decreases. The read layer 3 maintains a vertical magnetization state in which vertical magnetic anisotropy is predominant.

The auxiliary read layer 4 is formed on the read layer 3 by, say, direct-current sputtering and the like and is made from a GdFe-alloy film and the like. This auxiliary read layer 4 is provided for drastically changing the read layer 3's state at a read temperature which changes the read layer 3 from the in-plane magnetization state to the vertical magnetization state. By using this auxiliary read layer 4, the magneto-optical recording medium can provide higher density.

The non-magnetic layer 5 is provided for preventing exchange coupling among the read layer 3, the auxiliary read layer 4, and the recording layer 6 formed on the non-magnetic layer 5. The non-magnetic layer 5 is formed on the auxiliary read layer 4 by, say, high-frequency sputtering and the like and is made from a non-magnetic film such as an SiN film and the like.

The recording layer 6 records and stores information. In the magneto-optical recording medium according to the present invention, the recording layer 6 comprises a plurality of layers, namely a first layer 6a and a second layer 6b. The first layer 6a uses a recording material which gives parallel directions to saturation magnetization and sublattice magnetization on the recording layer 6. The second layer 6b uses a recording material which gives antiparallel directions to saturation magnetization and sublattice magnetization at room temperature. This material for the second layer 6b gives parallel directions to saturation magnetization and sublattice magnetization at around a read temperature which changes the read layer 3 from the in-plane magnetization state to the vertical magnetization state.

An appropriate recording material for the first layer 6a is a composition of TbFeCo alloy which features a compensation temperature lower than room temperature. The use of such a recording material for the first layer 6a of the recording layer 6 can decrease a recording noise. Generally, a conventional magneto-optical recording medium use the recording layer comprising a single-layer film of this TbFeCo alloy.

It is desirable to use a GdFeCo alloy with relatively weak magnetic anisotropy as a recording material for the second layer 6b so that there is provided exchange coupling with the first layer 6a. In this case, a sublattice magnetization direction for the second layer 6b follows that for the first layer 6a.

Of the recording layer 6, the second layer 6b should preferably use a recording material which provides a higher Curie temperature Tc2 than a Curie temperature Tc1 for a recording material constituting the first layer 6a. The use of such a material for the second layer 6b allows the recording layer 6 as a whole to provide relatively large saturation magnetization also at around the Curie temperature Tc1 of the first layer 6a. Accordingly, it is possible to generate a leakage field from the recording layer 6 also at around the Curie temperature Tc1 of the first layer 6a and properly transfer a recording mark.

The first layer 6a and the second layer 6b are formed in order on the non-magnetic layer 5 by means of, say, direct-current sputtering and the like. Specifically, the second layer 6b comprising a GdFeCo-alloy amorphous thin film is formed on the non-magnetic layer 5. Then, on this second layer 6b, the first layer 6a comprising a TbFeCo-alloy amorphous thin film is formed. It is possible to reverse this order of forming the first layer 6a and the second layer 6b. Namely, it may be preferable to form the first layer 6a on the non-magnetic layer 5, and then the second layer 6b on this first layer 6a.

The transparent dielectric layer 7 is formed on the recording layer 6 by, say, high-frequency sputtering and the like and is made from an SiN film and the like.

The heat diffusion layer 8 is provided for generating a distinct difference between a temperature change on the read layer 3 and that on the recording layer 6. The heat diffusion layer 8 is formed on the transparent dielectric layer 7 by means of, say, direct-current sputtering and the like.

As mentioned above, the magneto-optical recording medium according to the present invention includes the recording layer 6 comprising a plurality of layers, namely the first layer 6a and the second layer 6b. The first layer 6a uses a recording material which gives parallel directions to saturation magnetization and sublattice magnetization on the recording layer. The second layer 6b uses a recording material which gives antiparallel directions to saturation magnetization and sublattice magnetization at room temperature. This material for the second layer 6b gives parallel directions to saturation magnetization and sublattice magnetization at around a read temperature. Compared to a conventional magneto-optical recording medium, the saturation magnetization for the recording layer 6 is higher at around a read temperature, or is lower in a temperature range lower than the read temperature. Accordingly, the magneto-optical recording medium according to the present invention can increase a transfer force of a recording mark without degrading the spatial resolution.

The following provides more detailed description thereabout.

Figure 2:
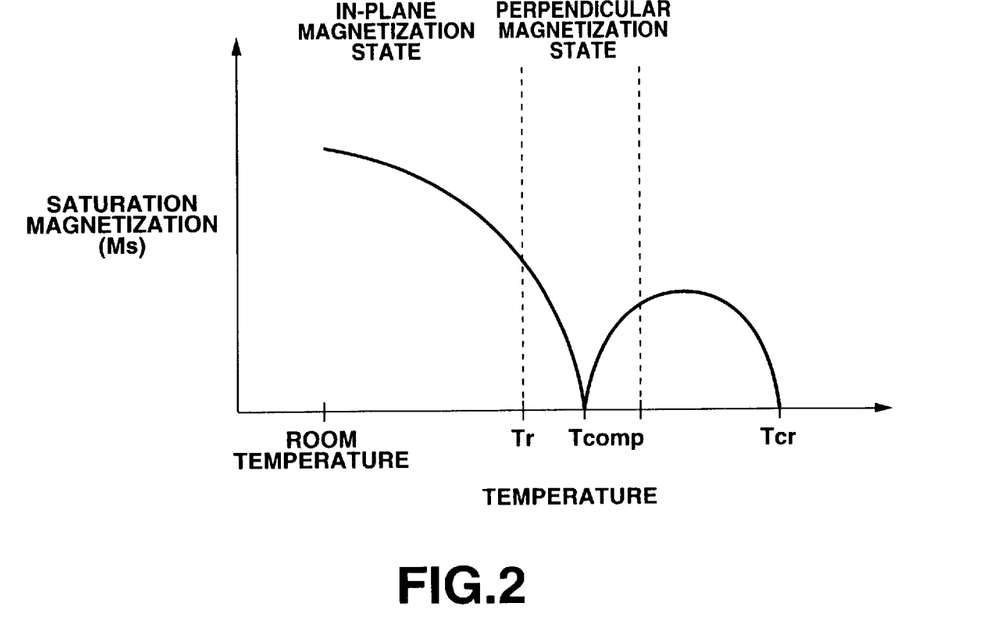
FIG. 2 shows a relationship between saturation magnetization and temperature on a read layer.

FIG. 2 shows a relationship between saturation magnetization (Ms) and temperature on the read layer 3. The read layer 3 maintains an in-plane magnetization state in which in-plane magnetic anisotropy is predominant with high saturation magnetization at room temperature. As the temperature rises and approaches a magnetic compensation temperature ($T_{comp}$), the saturation magnetization decreases gradually. At a specified temperature, say, 450 K, the read layer 3 changes to a vertical magnetization state in which vertical magnetic anisotropy is predominant. When the read layer 3 changes from the in-plane magnetization state to the vertical magnetization state, a temperature for this change is referred to as a read temperature (Tr). When the temperature exceeds the magnetic compensation temperature, the read layer 3's saturation magnetization increases again. When the temperature exceeds a Curie temperature (Tcr), the saturation magnetization is reset to 0.

Figure 3:
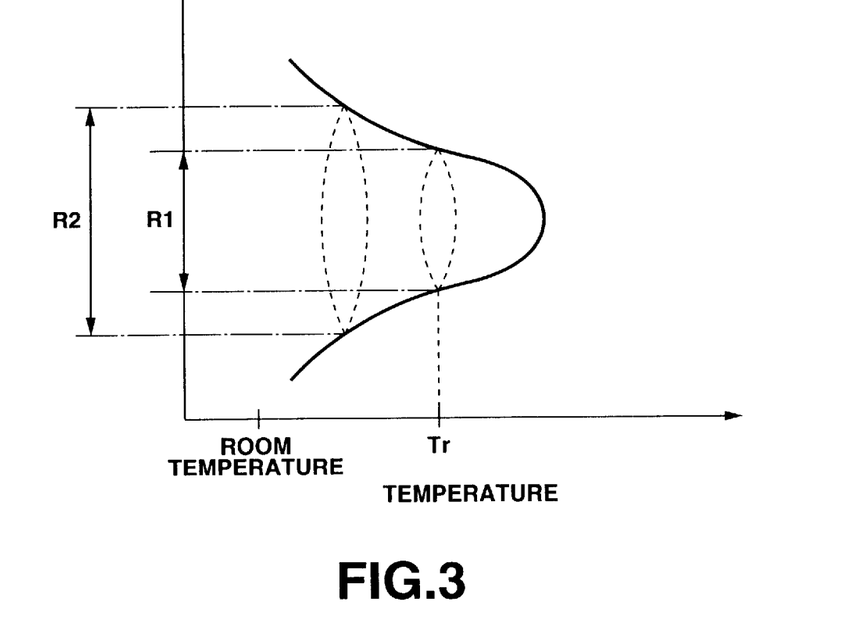
FIG. 3 shows temperature distribution for a reproduction light beam.

During reproduction, a reproduction light beam is irradiated to the read layer 3 with such a power as allows temperature at the spot center to exceed the above-mentioned read temperature. Irradiating the reproduction light beam to the read layer 3 increases the temperature of a layer's location where the beam is applied. The light beam is stopped down to a diffraction limit by means of a condensing lens and is irradiated to the read layer 3. The light intensity distribution becomes Gaussian distribution as shown in FIG. 3. As seen from the figure, a region R1 is narrower than a region R2. In the region R1, temperature exceeds the read temperature of the read layer 3. In the region R2, a reproduction light beam is formed.

A leakage field from the recording layer 6 is applied to a location which becomes a vertical magnetization state, exceeding the read layer 3's read temperature. This transfers a recording mark recorded on the recording layer 6. Since the region R1 is narrower than the region R2 as mentioned above, it is possible to read information from the recording mark which is smaller than a spot diameter of the reproduction light beam, increasing the recording density.

The recording mark recorded on the recording layer 6 needs to be properly transferred to a location which becomes the vertical magnetization state on the read layer 3. To do this, the recording layer 6 needs to maintain sufficient saturation magnetization at the read temperature and generate a leakage field needed for transferring the recording mark.

Figure 4:
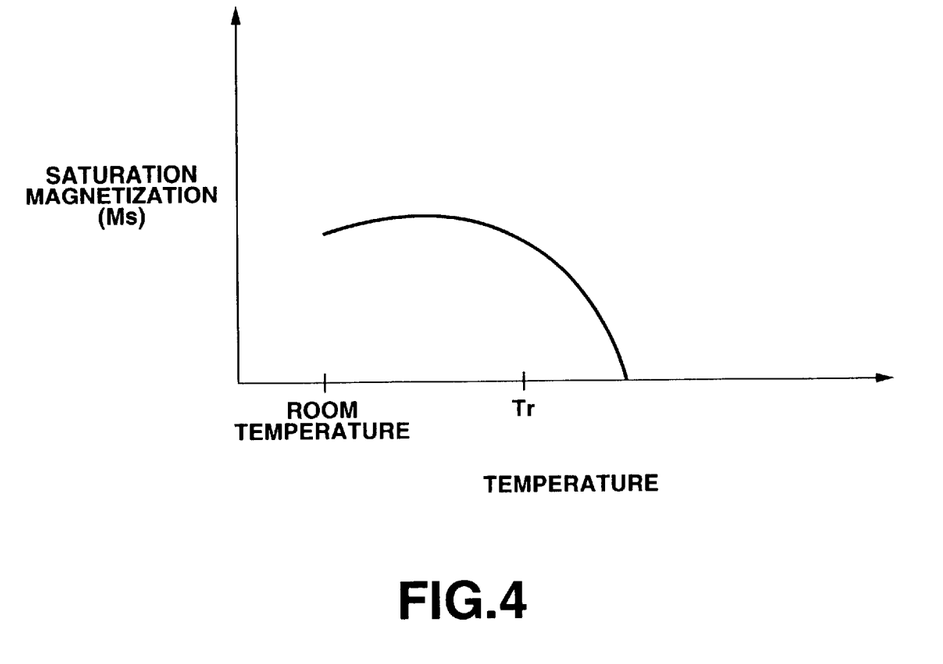
FIG. 4 shows a relationship between saturation magnetization and temperature on a recording layer of a conventional magneto-optical recording medium.

FIG. 4 shows a relationship between saturation magnetization (Ms) and temperature on a recording layer of a conventional magneto-optical recording medium, namely on a recording layer comprising a TbFeCo-alloy single layer. As shown in FIG. 4, the recording layer comprising a TbFeCo-alloy single layer is so composed as to maintain relatively high saturation magnetization also at the read temperature (Tr). However, the saturation magnetization is not always sufficient at the read temperature. There has been the case where a recording mark is not transferred properly. In the CAD system MSR, a transfer force depends on recording mark lengths. Namely, a transfer force with a long recording mark tends to be weaker than that with a short recording mark. Accordingly, even if a relatively short recording mark is transferred, a relatively long recording mark is not transferred properly, thus eventually causing a read error.

There are possible techniques to increase the saturation magnetization on the recording layer at the read temperature. One technique is to make the recording layer TM-rich by changing the recording layer composition, namely decreasing the rare-earth metal content. Another is to thicken the recording layer.

Figure 5:
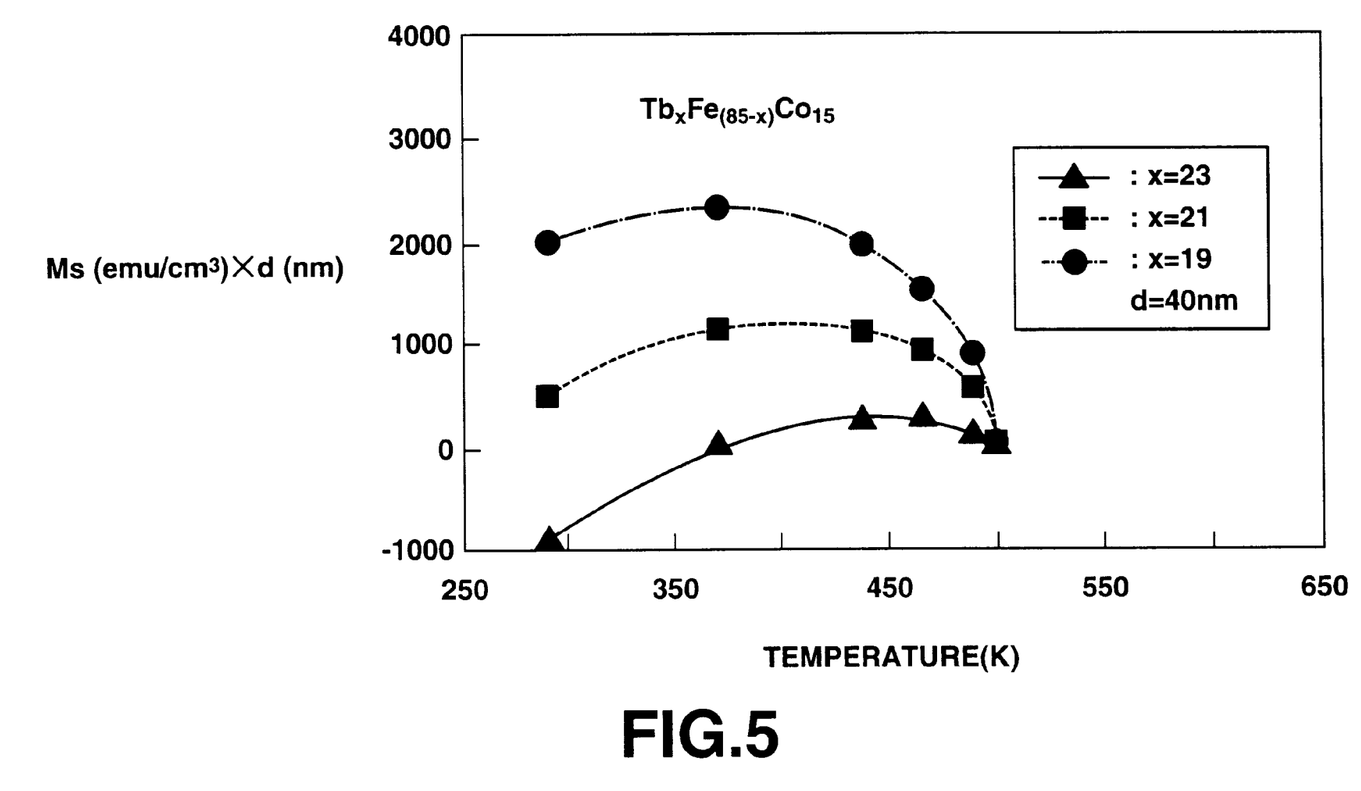
FIG. 5 shows how saturation magnetization varies when a rare-earth metal Tb content is changed for a recording layer comprising a TbFeCo-alloy single-layer film.

FIG. 5 shows how saturation magnetization varies when a rare-earth metal Tb content is changed for a recording layer comprising a TbFeCo-alloy single-layer film. Here, the recording layer composition is $Tb_x Fe_{(85-x)} Co_{15}$, where x is changed to 23, 21, and 19. The recording layer thickness (d) is fixed to 40 nm. In FIG. 5, the ordinate axis indicates the product of the recording layer's saturation magnetization (Ms) multiplied by the recording layer thickness (d). The abscissa axis denotes the absolute temperature (degree Kelvin). The read temperature approximates to 450 (K).

From FIG. 5, it is understood that the saturation magnetization is increased at the read temperature on the recording layer comprising a TbFeCo-alloy single-layer film by decreasing the Tb content and making the recording layer to be TM-rich.

Figure 6:
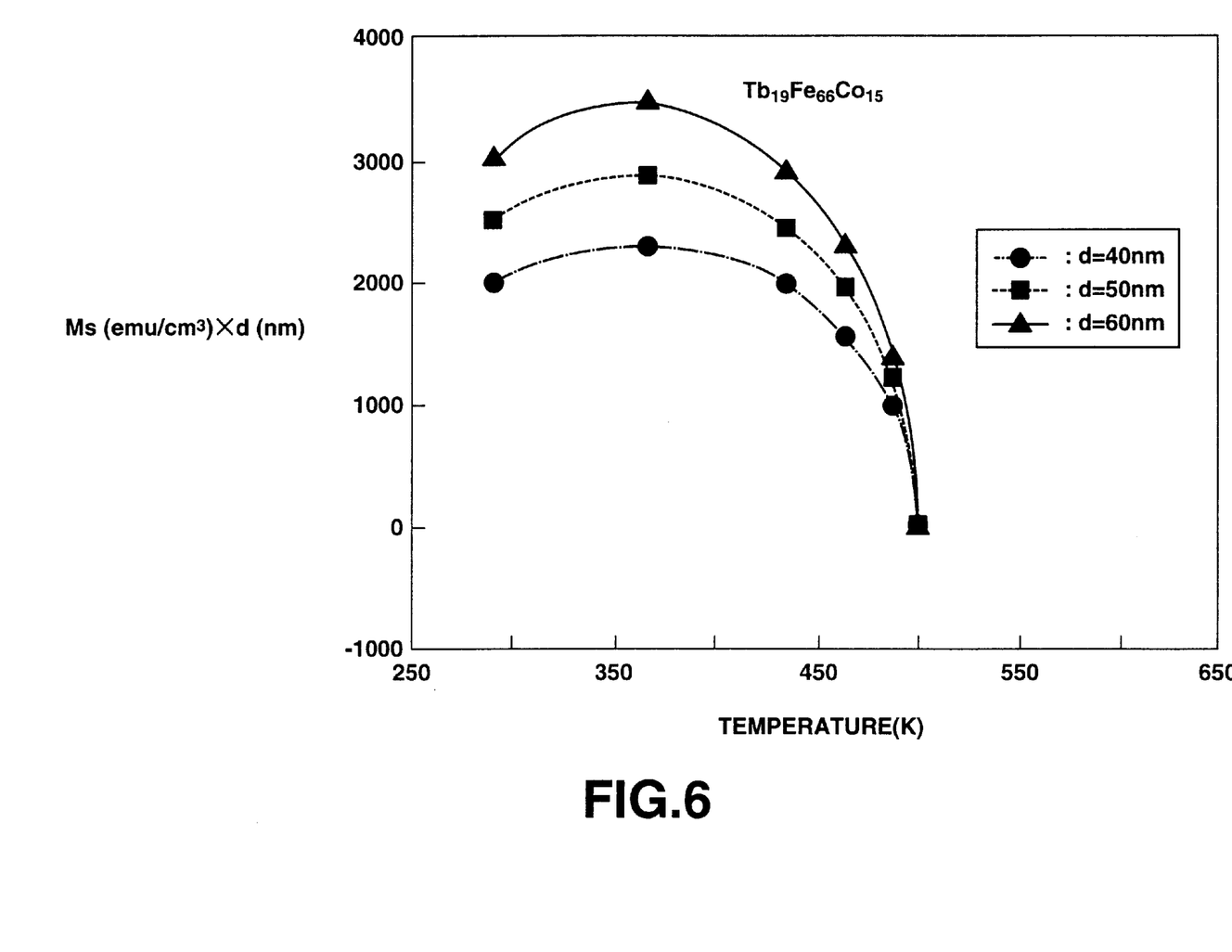
FIG. 6 shows how saturation magnetization varies when a layer thickness is changed for a recording layer comprising a TbFeCo-alloy single-layer film.

FIG. 6 shows how saturation magnetization varies when a layer thickness is changed for a recording layer comprising a TbFeCo-alloy single-layer film. Here, the recording layer composition is $Tb_{19} Fe_{66} Co_{15}$. The recording layer thickness (d) is changed to 40 nm, 50 nm, and 60 nm. In FIG. 6, the ordinate axis indicates the product of the recording layer's saturation magnetization (Ms) multiplied by the recording layer thickness (d). The abscissa axis denotes the absolute temperature (degree Kelvin). The read temperature approximates to 450 (K).

From FIG. 6, it is understood that the saturation magnetization is increased at the read temperature on the recording layer comprising a TbFeCo-alloy single-layer film also by thickening the recording layer.

As mentioned above, the recording layer's saturation magnetization can be increased at the read temperature by making the recording layer to be TM-rich or thickening the recording layer. As seen from FIGS. 5 and 6, however, these techniques also increase recording layer's saturation magnetization (Ms) in a temperature range lower than the read temperature. Consequently, the read temperature is spread to a low-temperature side, thus broadening a read area and degrading the spatial resolution.

Figure 7:
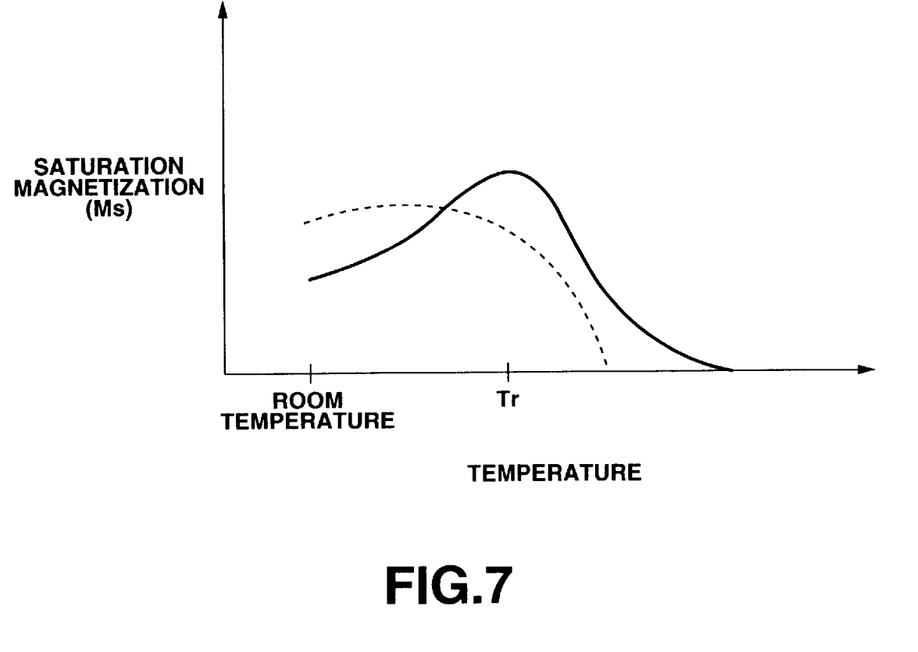
FIG. 7 collectively shows a relationship between saturation magnetization and temperature on recording layers of a magneto-optical recording medium according to the present invention and of a conventional magneto-optical recording medium.

As mentioned above, the magneto-optical recording medium according to the present invention includes the recording layer 6 comprising a plurality of layers, namely the first layer 6a and the second layer 6b. The first layer 6a uses a recording material which gives parallel directions to saturation magnetization and sublattice magnetization on the recording layer. The second layer 6b uses a recording material which gives antiparallel directions to saturation magnetization and sublattice magnetization at room temperature. This material for the second layer 6b gives parallel directions to saturation magnetization and sublattice magnetization at around a read temperature. This multi-layer structure is employed so that the recording layer 6's saturation magnetization (Ms) heightens at the read temperature and lowers at a temperature lower than the read temperature as shown in FIG. 7. Consequently, the magneto-optical recording medium according to the present invention can increase a transfer force of a recording mark without degrading the spatial resolution. In FIG. 7, the graph with a broken line indicates the saturation magnetization for the recording layer of the conventional magneto-optical recording medium, namely for the recording layer comprising a TbFeCo-alloy single-layer film.

Here, the recording layer 6's first layer 6a comprises a TM-rich rare-earth transition-metal (R-TM) alloy. Specifically, it comprises a $Tb_{19}Fe_{66}Co_{15}$ amorphous thin film which is a TbFeCo alloy with the decreased content of rare-earth metal Tb. The composition of this $Tb_{19}Fe_{66}Co_{15}$ makes saturation magnetization and sublattice magnetization directions parallel to each other. The sublattice magnetization is characterized in that spins in a sublattice are arranged parallel. For an amorphous thin film, "subnetwork magnetization" is a precise terminology because atoms form no lattice in this case. For simplicity of explanation, however, the term "sublattice magnetization" is used throughout this specification.

The recording layer 6's second layer 6b comprises an RE-rich rare-earth transition-metal alloy. Specifically, it comprises a $Gd_{24}Fe_{61}Co_{15}$ amorphous thin film, a $Gd_{26}Fe_{59}Co_{15}$ amorphous thin film, or the like which is a GdFeCo alloy with the increased content of rare-earth metal Gd. The composition of this $Gd_{24}Fe_{61}Co_{15}$ or $Gd_{26}Fe_{59}Co_{15}$ makes saturation magnetization and sublattice magnetization directions antiparallel at room temperature. The composition makes these directions parallel at around the read temperature.

Figure 8:
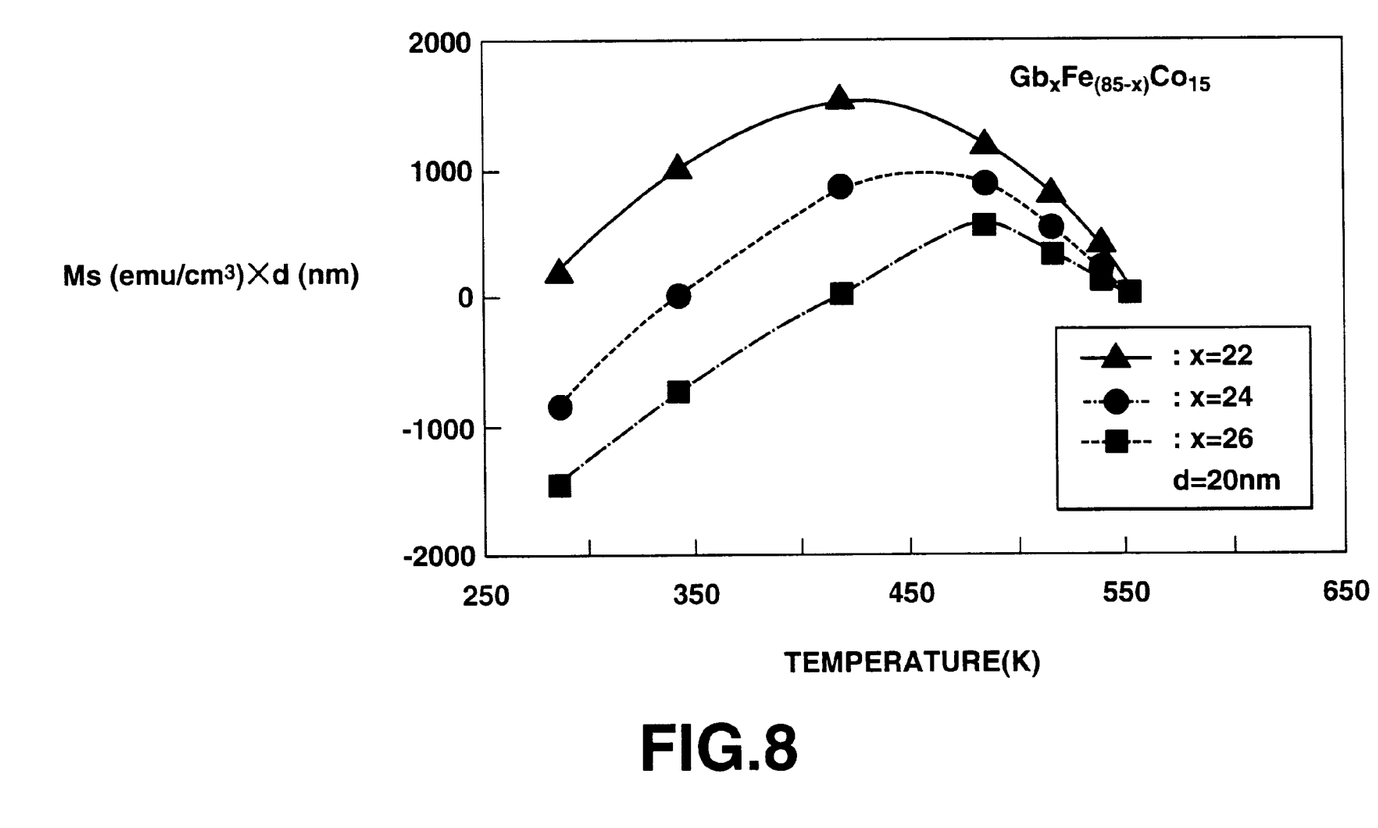
FIG. 8 shows how saturation magnetization varies when a rare-earth metal Gd content is changed for a GdFeCo-alloy amorphous thin film.

FIG. 8 shows how saturation magnetization varies when a rare-earth metal Gd content is changed for a GdFeCo-alloy amorphous thin film. Here, the GdFeCo-alloy composition is $Gd_xFe_{(85-x)}Co_{15}$, Where x is changed to 22, 24, and 26. The thickness (d) of the GdFeCo-alloy amorphous thin film is fixed to 20 nm. In FIG. 8, the ordinate axis indicates the product of the GdFeCo-alloy amorphous thin film's saturation magnetization (Ms) multiplied by this film thickness (d). The abscissa axis denotes the absolute temperature (degree Kelvin).

From FIG. 8, it is understood that saturation magnetization and sublattice magnetization directions are antiparallel at room temperature and are parallel at around the read temperature by increasing the Gd content for a GdFeCo-alloy amorphous thin film to become RE-rich. It should be noted that the room temperature approximates 295 (K); the read temperature approximates 450 (K).

As mentioned above, the multi-layer recording layer 6 comprises the first layer 6a and the second layer 6b. The saturation magnetization of this recording layer becomes higher at around the read temperature and lower in a temperature range lower than the read temperature in comparison with a TbFeCo-alloy single-layer recording layer of the conventional magneto-optical recording medium.

Figure 9:
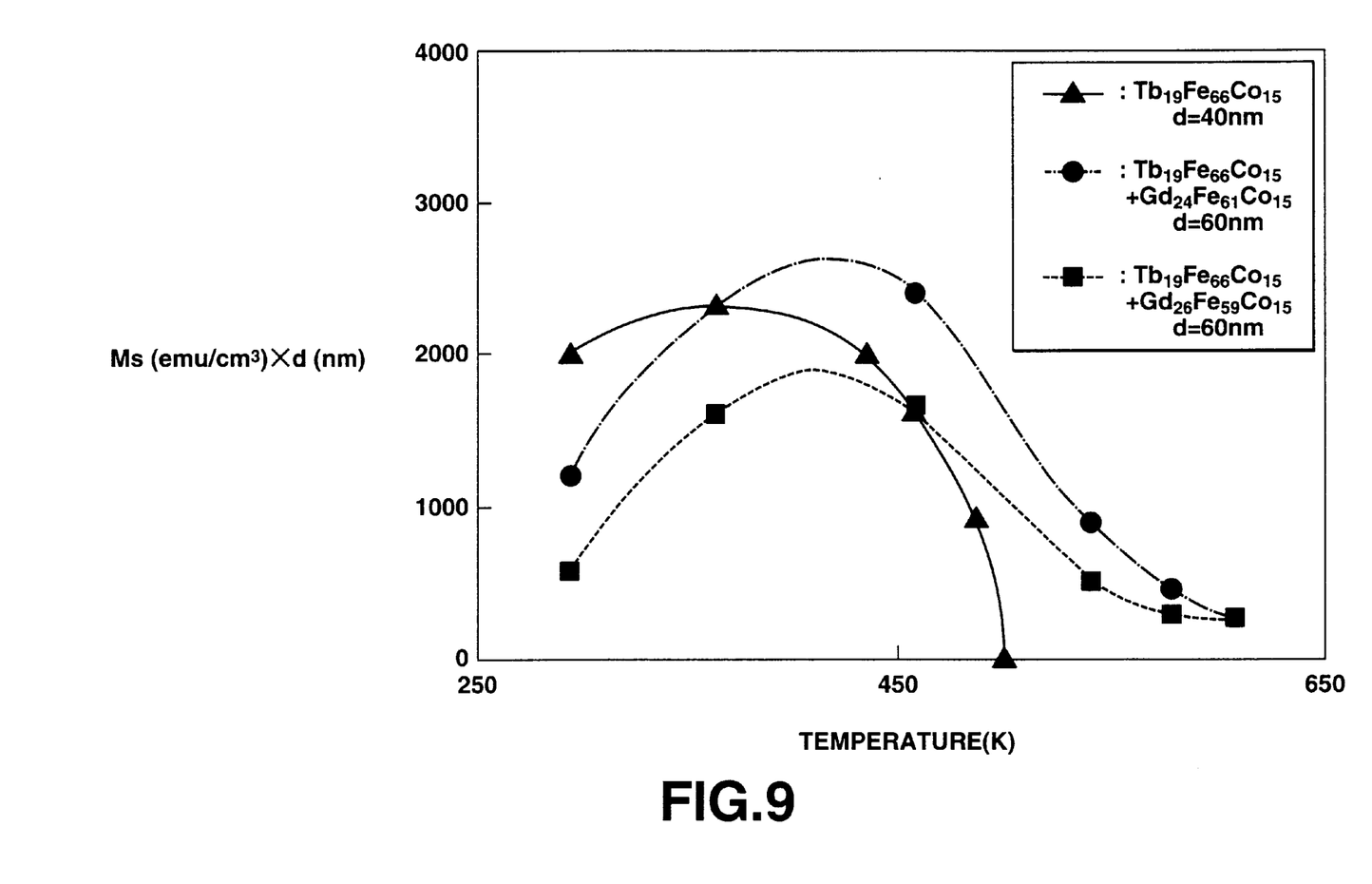
FIG. 9 collectively shows how saturation magnetization varies on a recording layer of a magneto-optical recording medium according to the present invention and on a recording layer comprising a TbFeCo-alloy single-layer film.

FIG. 9 collectively shows how saturation magnetization varies on the recording layer 6 comprising a plurality of layers, namely the first layer 6a and the second layer 6b and on a recording layer comprising a TbFeCo-alloy single-layer film.

With respect to the recording layer 6, the first layer 6a comprises a $Tb_{19}Fe_{66}Co_{15}$ amorphous thin film. The second layer 6b comprises a $Gd_{24}Fe_{61}Co_{15}$ amorphous thin film or a $Gd_{26}Fe_{59}Co_{15}$ amorphous thin film. The first layer 6a is 40 nm thick. The second layer 6b is 20 nm thick. The recording layer 6 as a whole is 60 nm thick. The TbFeCo-alloy single-layer recording layer is composed of $Tb_{19}Fe_{66}Co_{15}$ and is 40 nm thick. In FIG. 9, the ordinate axis indicates the product of each recording layer's saturation magnetization (Ms) multiplied by the corresponding film thickness (d). The abscissa axis denotes the absolute temperature (degree Kelvin).

The recording layer 6 comprises a plurality of layers, namely the first layer 6a made from the TM-rich rare-earth transition-metal alloy and the second layer 6b made from the RE-rich rare-earth transition-metal alloy. As seen from FIG. 9, the saturation magnetization of this recording layer 6 is higher at around the read temperature and is lower at around room temperature, namely in a temperature range lower than the read temperature in comparison with the TbFeCo-alloy single-layer recording layer. It should be noted that the room temperature approximates 295 (K); the read temperature approximates 450 (K).

As described above in detail, the magneto-optical recording medium according to the present invention causes the recording layer 6's saturation magnetization to be high at around the read temperature and to be low in a temperature range lower than the read temperature. This improves a transfer force of a recording mark without degrading the spatial resolution.

Embodiments

In order to confirm effects of the present invention, we actually fabricated magneto-optical recording media (embodiments 1 and 2) according to the present invention and evaluated recording and reproduction characteristics thereof. As a comparison example, we fabricated a magneto-optical recording medium whose recording layer comprises a TbFeCo-alloy single-layer film and also evaluated recording and reproduction characteristics thereof.

Fabricating a Magneto-Optical Recording Medium

The disk-shaped substrate 1.2 mm thick is fabricated from polycarbonate by means of injection molding. The injection molding process for the substrate 1 uses a stamper having a concavo-convex pattern corresponding to a groove so that a spiral groove is formed on the substrate 1. A high-frequency sputtering process is applied to the substrate 1 to form an SiN film 90 nm thick as the transparent dielectric layer 2.

On the transparent dielectric layer 2, direct-current sputtering is used to form a $Gd_{31}Fe_{54}Co_{15}$ amorphous thin film 20 nm thick as the read layer 3. On the read layer 3, direct-current sputtering is used to form a $Gd_{11}Fe_{89}$ amorphous thin film 10 nm thick as the auxiliary read layer 4.

Then, on the auxiliary read layer 4, high-frequency sputtering is used to form an SiN film 5 nm thick as the non-magnetic layer 5.

On the non-magnetic layer 5, direct-current sputtering is used to form the recording layer 6. With respect to the magneto-optical recording medium as a comparison example, a $Tb_{19}Fe_{66}Co_{15}$ amorphous thin film 40 nm thick is formed as a recording layer on the non-magnetic layer 5. With respect to the magneto-optical recording medium for a first embodiment, a $Gd_{24}Fe_{61}Co_{15}$ amorphous thin film 20 nm thick is formed as the second layer 6b on the non-magnetic layer 5. Further, a $Tb_{19}Fe_{66}Co_{15}$ amorphous thin film 40 nm thick is formed as the first layer 6a on the second layer 6b. These first layer 6a and second layer 6b are laminated to form the recording layer 6. With respect to the magneto-optical recording medium for a second embodiment, a $Gd_{26}Fe_{59}Co_{15}$ amorphous thin film 20 nm thick is formed as the second layer 6b on the non-magnetic layer 5. Further, a $Tb_{19}Fe_{66}Co_{15}$ amorphous thin film 40 nm thick is formed as the first layer 6a on the second layer 6b. These first layer 6a and second layer 6b are laminated to form the recording layer 6.

Then, high-frequency sputtering is used to form an SiN film 25 nm thick as the transparent dielectric layer 7 on the recording layer 6. Finally, direct-current sputtering is used to form an Al alloy film 40 nm thick as the heat diffusion layer 8 on the transparent dielectric layer 7.

The above-mentioned processes were conducted to complete the respective magneto-optical recording media for the embodiments 1 and 2 and the comparison example. These magneto-optical recording media provide a track pitch of 0.65 μm and are suitable for a land-groove recording technique which writes information to both a groove and a land between adjacent grooves.

Evaluating Recording and Reproduction Characteristics

Each of the thus fabricated magneto-optical recording media is rotated at a linear speed of 9.5 m/s. A recording magnetic field of −24 kA/m is applied to record a (1–7) modulation random signal with the shortest mark length of 0.4 μm onto a land. By rotating these magneto-optical recording media at the same linear speed, a reproduction magnetic field of +8 kA/m is applied to reproduce the recorded signal and measure a byte error rate (BER) during recording and reproduction.

Figure 10:
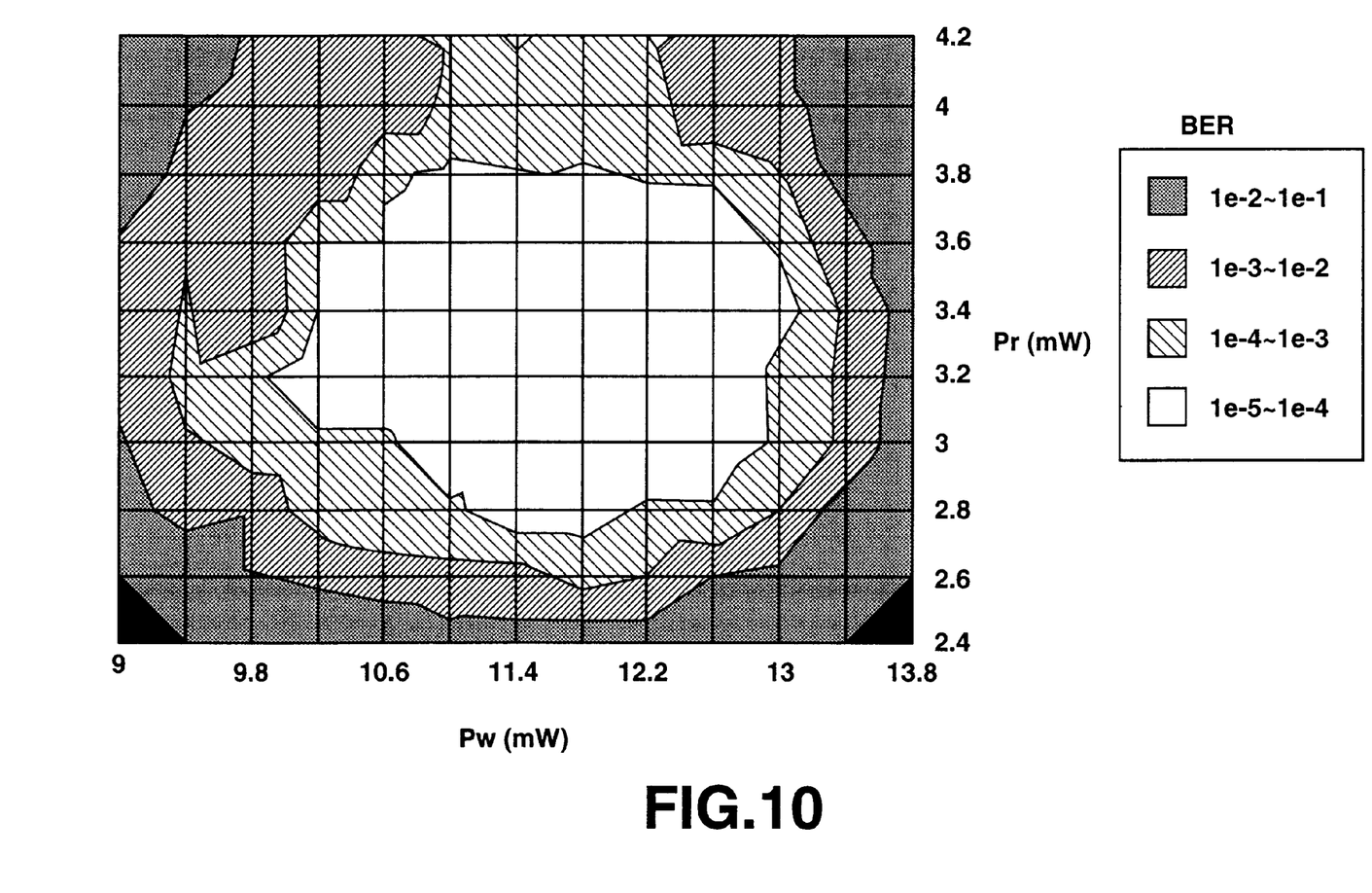
FIG. 10 shows a relationship between a byte error rate and a recording and reproduction light beam power for a magneto-optical recording medium according to a first embodiment.
Figure 11:
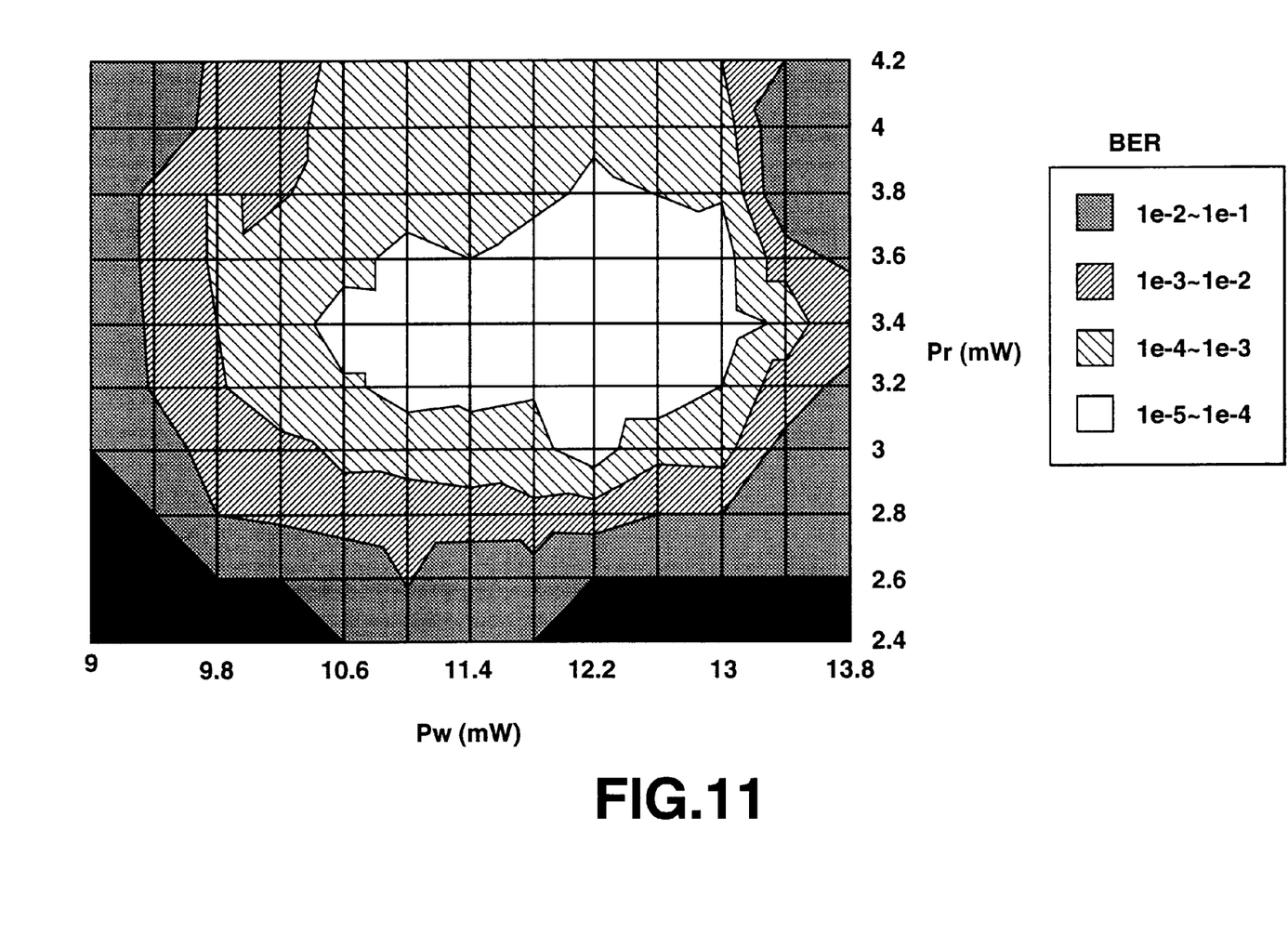
FIG. 11 shows a relationship between a byte error rate and a recording and reproduction light beam power for a magneto-optical recording medium according to a second embodiment.
Figure 12:
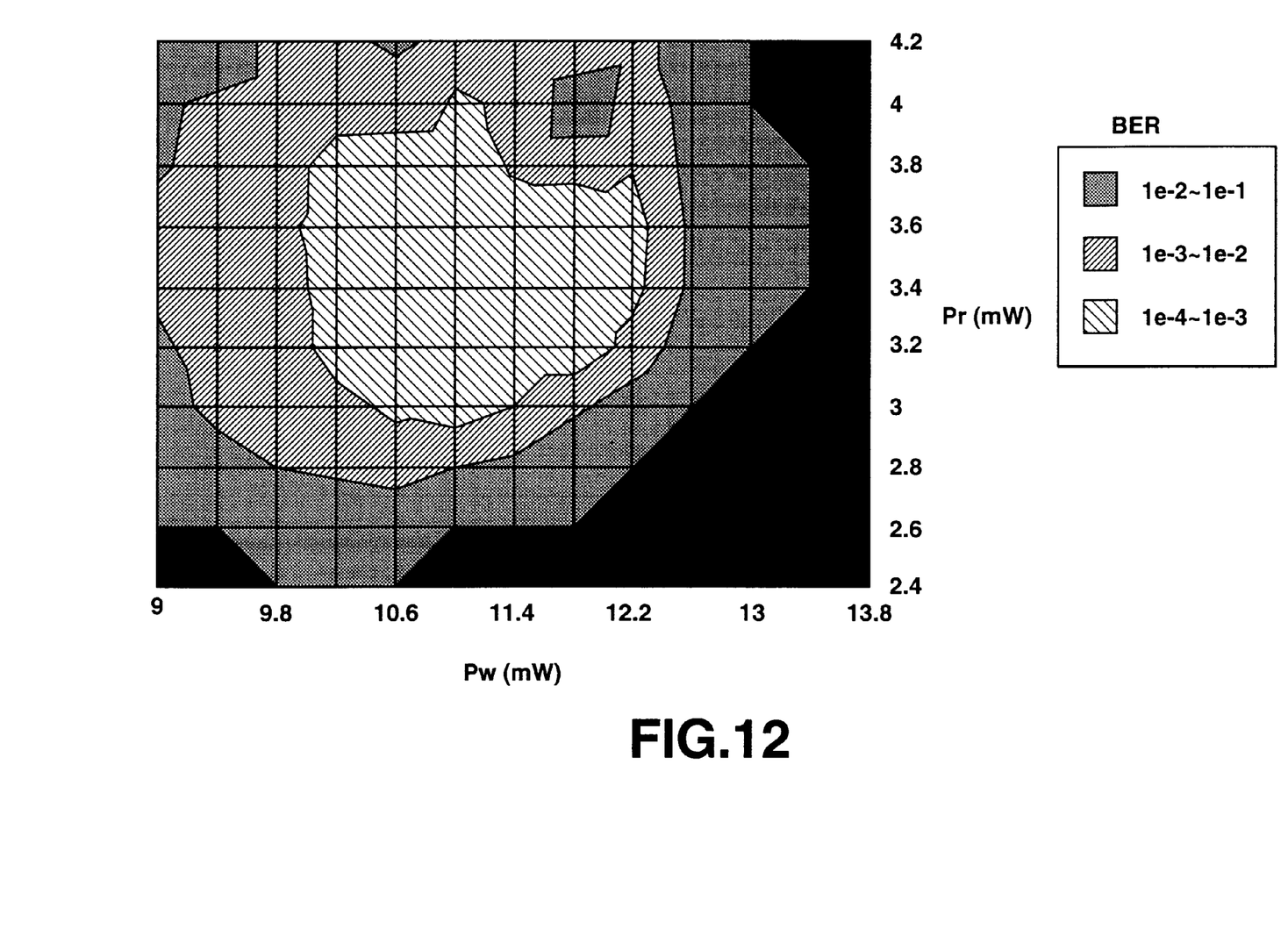
FIG. 12 shows a relationship between a byte error rate and a recording and reproduction light beam power for a magneto-optical recording medium according to a comparison example.

Here, recording and reproducing byte error rates depend on recording and reproduction light beam powers. An investigation was made into byte error rate distributions in relation to recording and reproduction light beam powers. Data as shown in FIGS. 10 through 12 resulted. FIG. 10 shows a relationship between a byte error rate and a recording and reproduction light beam power for a magneto-optical recording medium according to a first embodiment. FIG. 11 shows a relationship between a byte error rate and a recording and reproduction light beam power for a magneto-optical recording medium according to a second embodiment. FIG. 12 shows a relationship between a byte error rate and a recording and reproduction light beam power for a magneto-optical recording medium according to a comparison example. In FIGS. 10 through 12, the ordinate axis denotes a reproduction light beam power (Pr). The abscissa axis denotes a recording light beam power (Pw).

As is apparent from FIGS. 10 through 12, the magneto-optical recording media according to the first and second embodiments greatly increase a region of recording and reproduction conditions with a very low byte error rate compared to the magneto-optical recording medium according to the comparison example. Namely, this region indicates recording and reproduction conditions (recording and reproduction light beam powers) for properly reading information without read errors. Accordingly, it is understood that the magneto-optical recording media according to the first and second embodiments improve a transfer force of a recording mark.

Each magneto-optical recording medium is rotated at a linear speed of 9.5 m/s. A recording magnetic field of −24 kA/m is applied. A recording light beam with the optimal power is irradiated to continuously record the shortest recording mark. Further, these magneto-optical recording media are rotated at the same linear speed. A reproduction magnetic field of +8 kA/m is applied. A reproduction light beam with the optimal power is irradiated to measure the C/N when this recording mark is read. The magneto-optical recording medium as the comparison example provides the 46.5 dB C/N. The magneto-optical recording medium according to the first embodiment provides the 46.8 dB C/N. The magneto-optical recording medium according to the second embodiment provides the 47.3 dB C/N. These results show that the magneto-optical recording media according to the first and second embodiments do not decrease signal amplitudes at the highest frequency, namely do not degrade the spatial resolution in comparison with the magneto-optical recording medium as the comparison example.

From the above-mentioned results, it is found that the magneto-optical recording media according to the first and second embodiments improve a transfer force of a recording mark without degrading the spatial resolution.

What is claimed is:

1. A magneto-optical recording medium, comprising:
   a read layer maintaining an in-plane magnetization state predominantly characterized by in-plane magnetic anisotropy at room temperature and changing to a vertical magnetization state predominantly characterized by vertical magnetic anisotropy as temperature rises;
   a recording layer for recording and storing information; and
   a non-magnetic film sandwiched between said read layer and said recording layer for preventing exchange coupling between said read layer and said recording layer; wherein,
      said recording layer comprises a first layer and a second layer with different compositions from each other,
      said first layer is made from a recording material that exhibits magnetization in a first direction in the presence of saturation magnetization and sublattice magnetization, and
      said second layer is made from a recording material that exhibits magnetization in a second direction different than the first direction in the presence of saturation magnetization and sublattice magnetization at room temperature exhibits magnetization in said first direction in the presence of saturation magnetization and sublattice magnetization at around a read temperature at which said read layer changes from an in-plane magnetization state to a vertical magnetization state.

2. The magneto-optical recording medium according to claim 1, wherein a relation of Tc1<Tc2 is established, where Tc1 is a Curie temperature for a recording material constituting said first layer and Tc2 is a Curie temperature for a recording material constituting said second layer.

3. The magneto-optical recording medium according to claim 1, wherein said first layer comprises a TbFeCo-alloy amorphous thin film and said second layer comprises a GdFeCo-alloy amorphous thin film.

4. The magneto-optical recording medium according to claim 1, wherein there is provided an auxiliary read layer between said read layer and said recording layer for drastically changing a state of said read layer at said read temperature.

5. The magneto-optical recording medium according to claim 1, wherein said auxiliary read layer comprises a GdFe alloy.

6. A magneto-optical recording medium comprising, in order:

a transparent dielectric layer;

a read layer maintaining an in-plane magnetization state predominantly characterized by in-plane magnetic anisotropy at room temperature and changing to a vertical magnetization state predominantly characterized by vertical magnetic anisotropy as temperature rises;

auxiliary read layer for drastically changing a state of said read layer at a read temperature;

a non-magnetic film;

a recording layer for recording and storing information, said non-magnetic film being sandwiched between said read layer and said recording layer for preventing exchange coupling between said read layer and said recording layer;

another transparent dielectric layer;

a heat diffusion layer; and a substrate on which the foregoing a layered, wherein, said recording layer comprises a first layer and a second layer with different compositions from each other, said first layer is made from a recording material that exhibits magnetization in a first direction in the presence of saturation magnetization and sublattice magnetization; and said second layer is made from a recording material that exhibits magnetization in a second direction different than said first direction in the presence of saturation magnetization and sublattice magnetization at room temperature and that exhibits magnetization in said first direction in the presence of saturation magnetization and sublattice magnetization at around said read temperature at which said read layer changes from an in-plane magnetization state to vertical magnetization state

* * * * *